United States Patent
Ho

(10) Patent No.: US 8,640,578 B2
(45) Date of Patent: Feb. 4, 2014

(54) TOOL POST ASSEMBLY FOR QUICK DISPLACEMENT OF A TOOL OF A MACHINE TOOL

(76) Inventor: Chih-Huang Ho, Taichung (TW)

(*) Notice: Subject to any disclaimer, the term of this patent is extended or adjusted under 35 U.S.C. 154(b) by 183 days.

(21) Appl. No.: 13/419,181

(22) Filed: Mar. 13, 2012

(65) Prior Publication Data
US 2013/0104708 A1 May 2, 2013

(51) Int. Cl.
*B23B 29/18* (2006.01)
(52) U.S. Cl.
USPC .............................. 82/161; 82/158
(58) Field of Classification Search
USPC ................... 82/158, 159, 160, 161
See application file for complete search history.

(56) References Cited

U.S. PATENT DOCUMENTS

| | | | | | |
|---|---|---|---|---|---|
| 3,014,391 | A | * | 12/1961 | Fuhrman | 82/148 |
| 3,733,925 | A | * | 5/1973 | Schmidt et al. | 82/139 |
| 4,450,737 | A | * | 5/1984 | Hitt | 82/137 |
| 5,943,927 | A | * | 8/1999 | Hanson et al. | 82/1.11 |
| 6,105,476 | A | * | 8/2000 | Peterson et al. | 82/1.11 |
| 8,316,743 | B2 | * | 11/2012 | Carson | 82/161 |
| 2011/0271804 | A1 | * | 11/2011 | Hsieh | 82/158 |

* cited by examiner

*Primary Examiner* — Daniel W. Howell
*Assistant Examiner* — Nicole N Ramos
(74) *Attorney, Agent, or Firm* — Merchant & Gould P.C.

(57) ABSTRACT

A tool post assembly includes a tool post body adapted to be mounted on a machine tool, a carrier block coupled to and movable relative to the tool post body by means of a tenon-and-mortise structure, and a lever pivotally mounted on the tool post body and having a manually operable power end and a weight end which is coupled to the carrier block such that, when the power end is actuated, the carrier block is moved from a normal position to a lifted position so as to quickly displace a tool held thereby away from a workpiece.

11 Claims, 10 Drawing Sheets

TOOL POST ASSEMBLY FOR QUICK DISPLACEMENT OF A TOOL OF A MACHINE TOOL

Priority under §119 is made to Serial No. 100220134, filed 26 Oct. 2011 in Taiwan and which application is incorporated herein by reference.

BACKGROUND OF THE INVENTION

1. Field of the Invention

This invention relates to a tool post assembly for a machine tool, more particularly to a tool post assembly for quick displacement of a tool of a machine tool.

2. Description of the Related Art

Referring to FIG. 1, a conventional machine tool generally has a tool holding device 10 mounted thereon. The tool holding device 10 is shown to include a saddle 11 secured on an apron 20, a cross-slide 12 slidably mounted on the saddle 11 and having a cross-slide feedscrew 13 to perform an X-direction movement, a top-slide 14 slidably mounted on the cross-slide 12 and having a top-slide feedscrew 15 to perform a Y-direction movement, and a tool post 16 slidably mounted on the top-slide 14 and having a toolpost feedscrew 17 to perform a Z-direction movement. A tool 21 is selectively mounted in the tool post 16 so as to be operated by the tool holding device 10. However, in a precision processing operation, for example, a prober testing process for semiconductor chips or micromechanical devices, it is required to quickly remove the tool 21 away from a workpiece (not shown) to replace the workpiece or the tool 21 during the testing process. With such conventional tool holding device 10, the displacement of the tool 21 is quite slow so that the machining or precision processing efficiency is unsatisfactory.

SUMMARY OF THE INVENTION

An object of the present invention is to provide a tool post assembly which is capable of allowing quick displacement of a tool held thereon during operation.

According to this invention, the tool post assembly includes a tool post body having slide-side and carrier-side segments opposite to each other in a longitudinal direction. The slide-side segment is adapted to be mounted on the machine tool. The carrier-side segment has a mount surface which extends in the longitudinal direction away from the slide-side segment to terminate at a first marginal edge, and a front surface which extends from the first marginal edge in a first transverse direction that is transverse to the longitudinal direction. A carrier block has a top surface which extends in the longitudinal direction to terminate at a second marginal edge, and a rear surface which extends from the second marginal edge in the first transverse direction, and which is spaced apart from the front surface in the longitudinal direction. A linear guide mechanism is of a tenon-and-mortise structure disposed between the front and rear surfaces to permit the carrier block to be movable relative to the tool post body in the first transverse direction between normal and lifted positions. A ledge is disposed to extend from the second marginal edge toward the first marginal edge. A lever is pivotally mounted on the mount surface about a pivot axis oriented in a second transverse direction that is transverse to the longitudinal and first transverse directions. The lever has a power end manually operable, and a weight end which extends beyond the first marginal edge, and which is disposed beneath the ledge. Therefore, when the power end is actuated, the carrier block is moved from the normal position to the lifted position, thereby quickly displacing the tool held by the carrier block.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
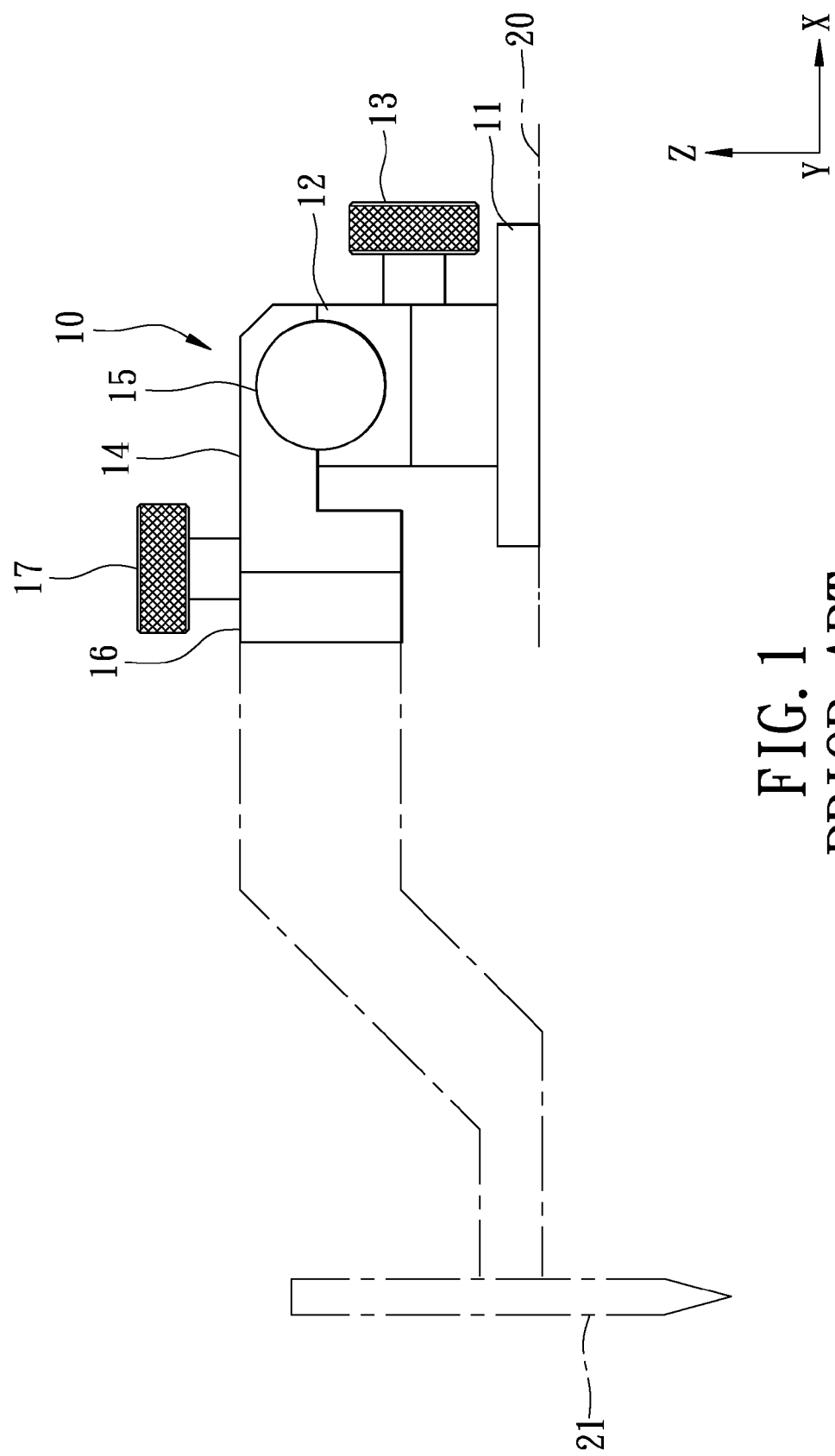
FIG. 1 is a schematic view of a conventional tool holding device for a machine tool.

Before the present invention is described in greater detail, it should be noted that same reference numerals have been used to denote like elements throughout the specification.

Figure 2:
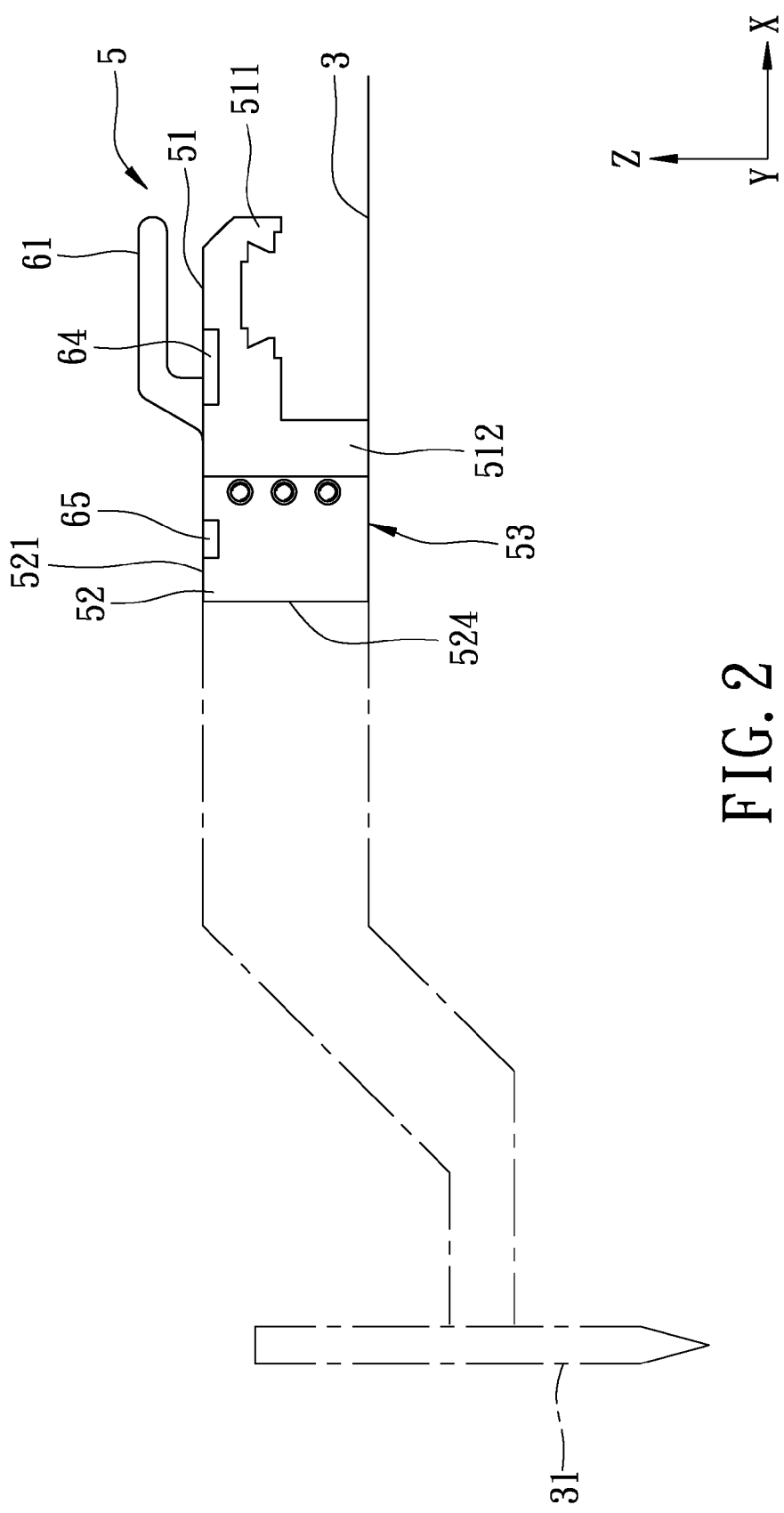
FIG. 2 is a schematic view of the first embodiment of a tool post assembly according to this invention.
Figure 3:
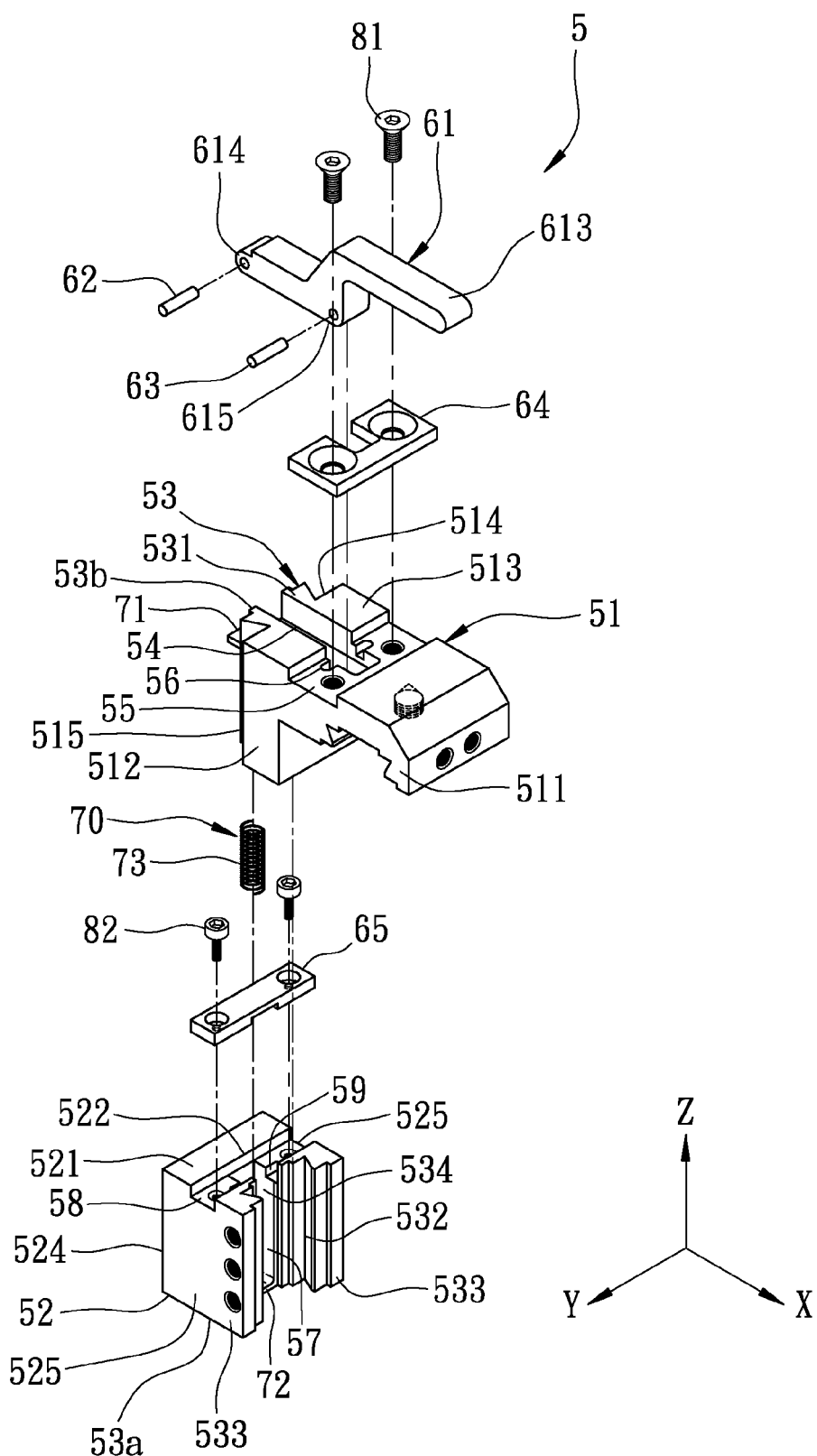
FIG. 3 is an exploded perspective view of the first embodiment.
Figure 4:
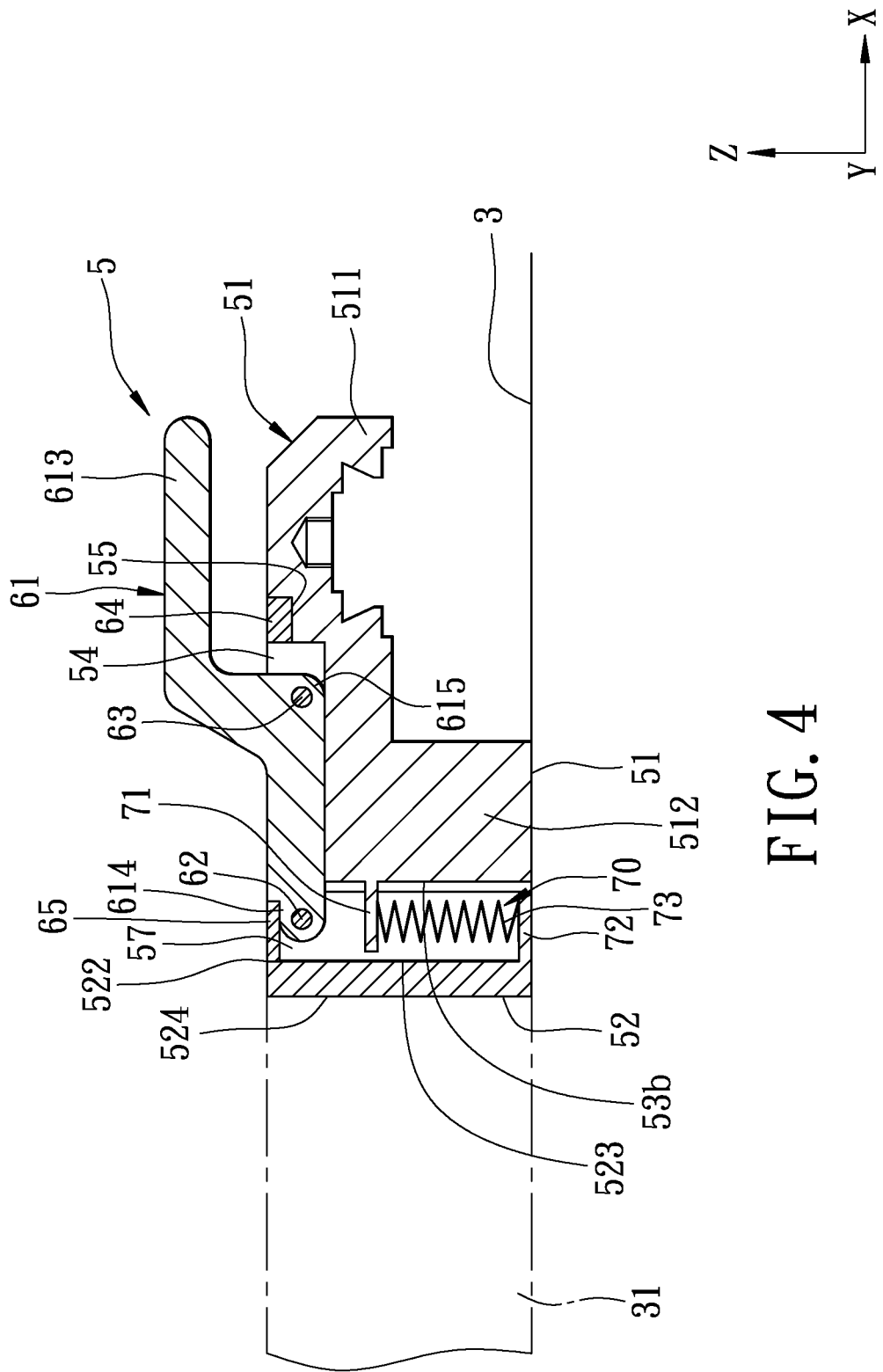
FIG. 4 is a sectional view of the first embodiment showing a carrier block in a normal position.

Referring to FIGS. 2 to 4, the first embodiment of a tool post assembly 5 according to the present invention is shown to comprise a tool post body 51, a carrier block 52, a linear guide mechanism 53, a lever 61, and a biasing unit 70.

The tool post body 51 has slide-side and carrier-side segments 511, 512 opposite to each other in a longitudinal direction (X). The slide-side segment 511 is adapted to be mounted on an apron 3 or a cross-slide 42 (see FIGS. 9 and 10) of a machine tool. The carrier-side segment 512 has a mount surface 513 which extends in the longitudinal direction (X) away from the slide-side segment 511 to terminate at a first marginal edge 514, and a front surface 515 which extends from the first marginal edge 514 in a first transverse direction (Z) that is perpendicular to the longitudinal direction (X).

The carrier block 52 has a top surface 521 which extends in the longitudinal direction (X) to terminate at a second marginal edge 522, a rear surface 523 which extends from the second marginal edge 522 in the first transverse direction (Z), and which is spaced apart from the front surface 515 in the longitudinal direction (X), and a tool-holder side surface 524 which is opposite to the rear surface 523 in the longitudinal direction (X), and which is adapted for holding a tool 31 of the machine tool.

The linear guide mechanism 53 is of a tenon-and-mortise structure disposed between the front and rear surfaces 515, 523. Specifically, the tenon-and-mortise structure includes a mortise body (53a) which is coupled to the rear surface 523, and which has a dovetail recess region 532, and a tenon body (53b) which is coupled to the front surface 515, and which has a dovetail wedge region 531 that is interlockably and slidably engaged in the dovetail recess region 532 so as to permit the carrier block 52 to be movable relative to the tool post body 51 in the first transverse direction (Z) between normal and lifted positions. The mortise body (53a) has two lateral halves 533 spaced apart from each other by an elongated gap 534 in a second transverse direction (Y) that is perpendicular to both the longitudinal direction (X) and the first transverse direction (Z).

Further, the carrier block 52 has two spacers 525 which are disposed between the mortise body (53a) and the rear surface 523, and which are spaced apart from each other in the second transverse direction (Y) by an elongated groove 57 that communicates the elongated gap 534. The spacers 525 may be integrally formed with the mortise body (53a), and lower than the top surface 521 so as to form a recessed cavity 58 that extends in the second transverse direction (Y). A pin receiving cavity 59 is formed in the recessed cavity 58 and extends in the second transverse directions (Y). An elongated bar 65 is fitted in the recessed cavity 58 to be fastened to the spacers 525 by means of screws 82, and has a bridging segment that spans over the elongated groove 57 so as to serve as a ledge.

Further, the mount surface 513 has a longitudinal concavity 54 which extends through the tenon body (53b) in the longitudinal direction (X), a transverse concavity 55 which extends in the second transverse direction (Y) and which is in spatial communication with the longitudinal concavity 54, and a pivot receiving cavity 56 which is formed in the transverse concavity 55 and which extends in the second transverse direction (Y). A retaining plate 64 is fitted in the transverse concavity 55 to be secured to the mount surface 513 by means of screws 81, and spans over the pivot receiving cavity 56.

Figure 5:
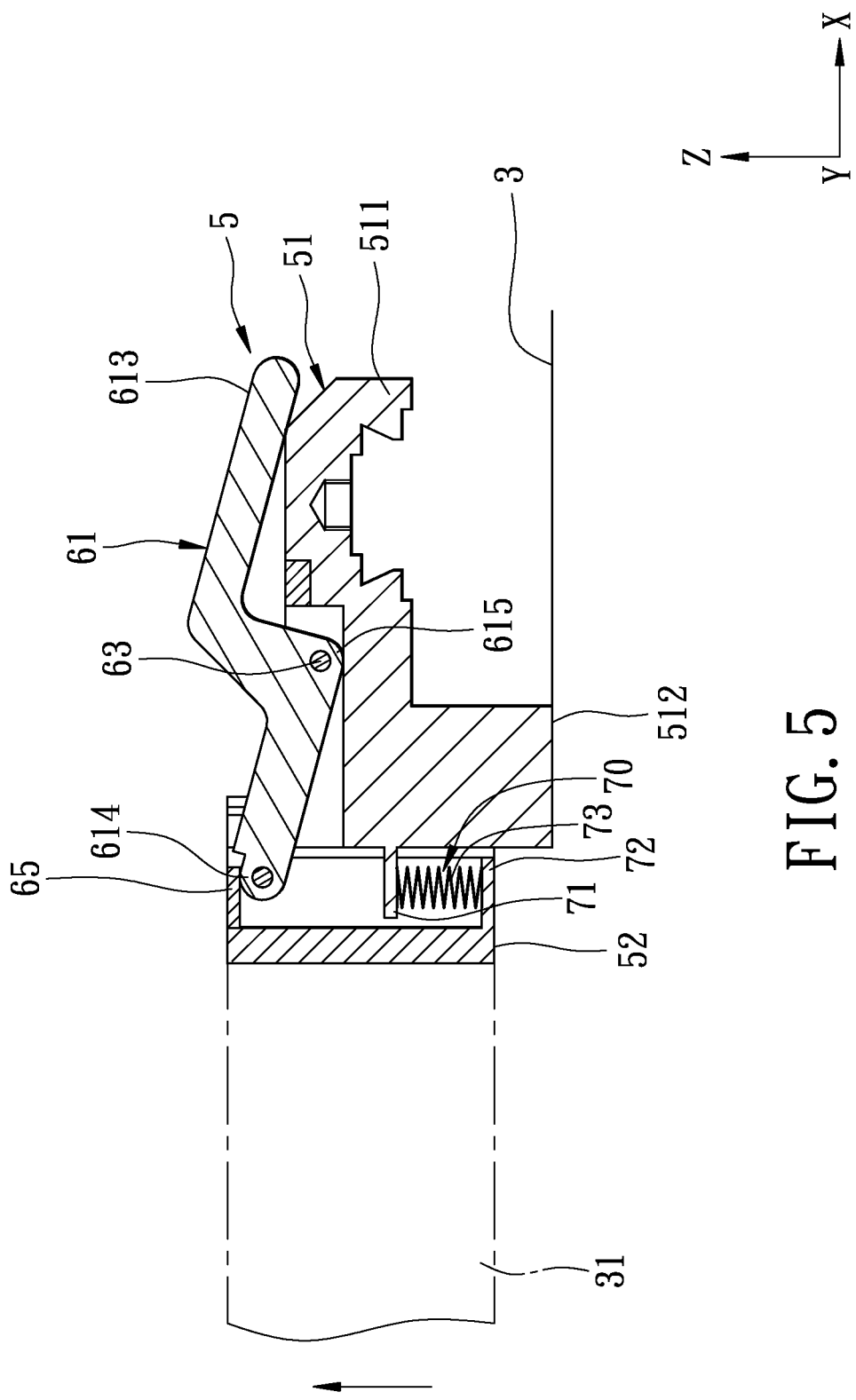
FIG. 5 is a sectional view showing the carrier block in a lifted position.
Figure 6:
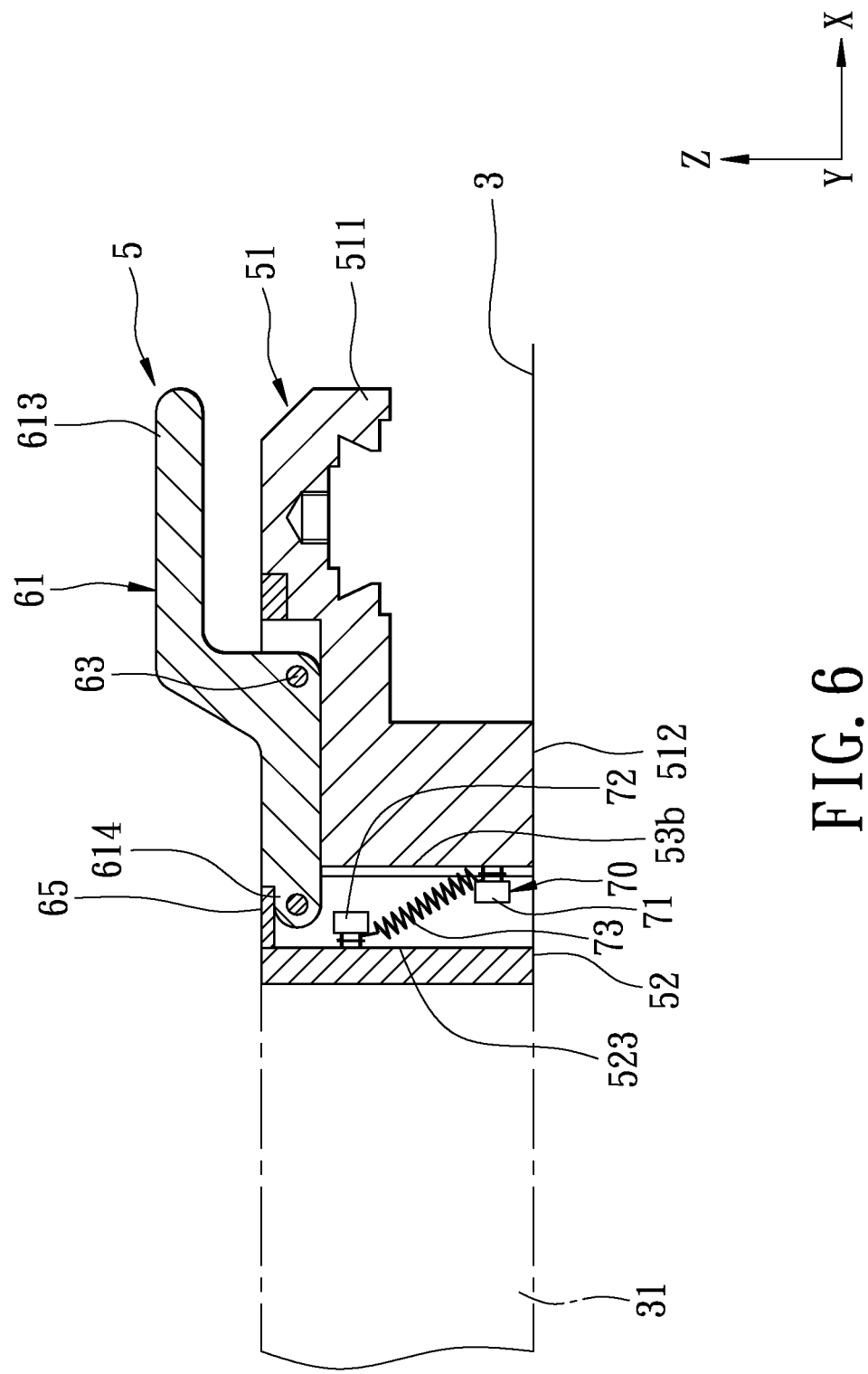
FIG. 6 is a sectional view of an alternative form of the first embodiment.

The lever 61 has a fulcrum portion 615 pivotally mounted on the mount surface 513 about a pivot axis that is oriented in the second transverse direction (Y). In this embodiment, the fulcrum portion 615 has a pivot pin 63 which is retained in the pivot receiving cavity 56 by the retaining plate 64. The lever 61 has a power end 613 which extends from the fulcrum portion 615 in the longitudinal direction (X) to be manually operable, and a weight end 614 which extends beyond the first marginal edge 514 and through the elongated gap 534 to be accommodated in the elongated groove 57 so as to be disposed beneath the elongated bar 65, and which has a pin 62 retained in the pin receiving cavity 59 by the elongated bar 65 such that, when the power end 613 is pressed, the carrier block 52 is moved from the normal position (as shown in FIG. 4) to the lifted position (as shown in FIG. 5).

Figure 7:
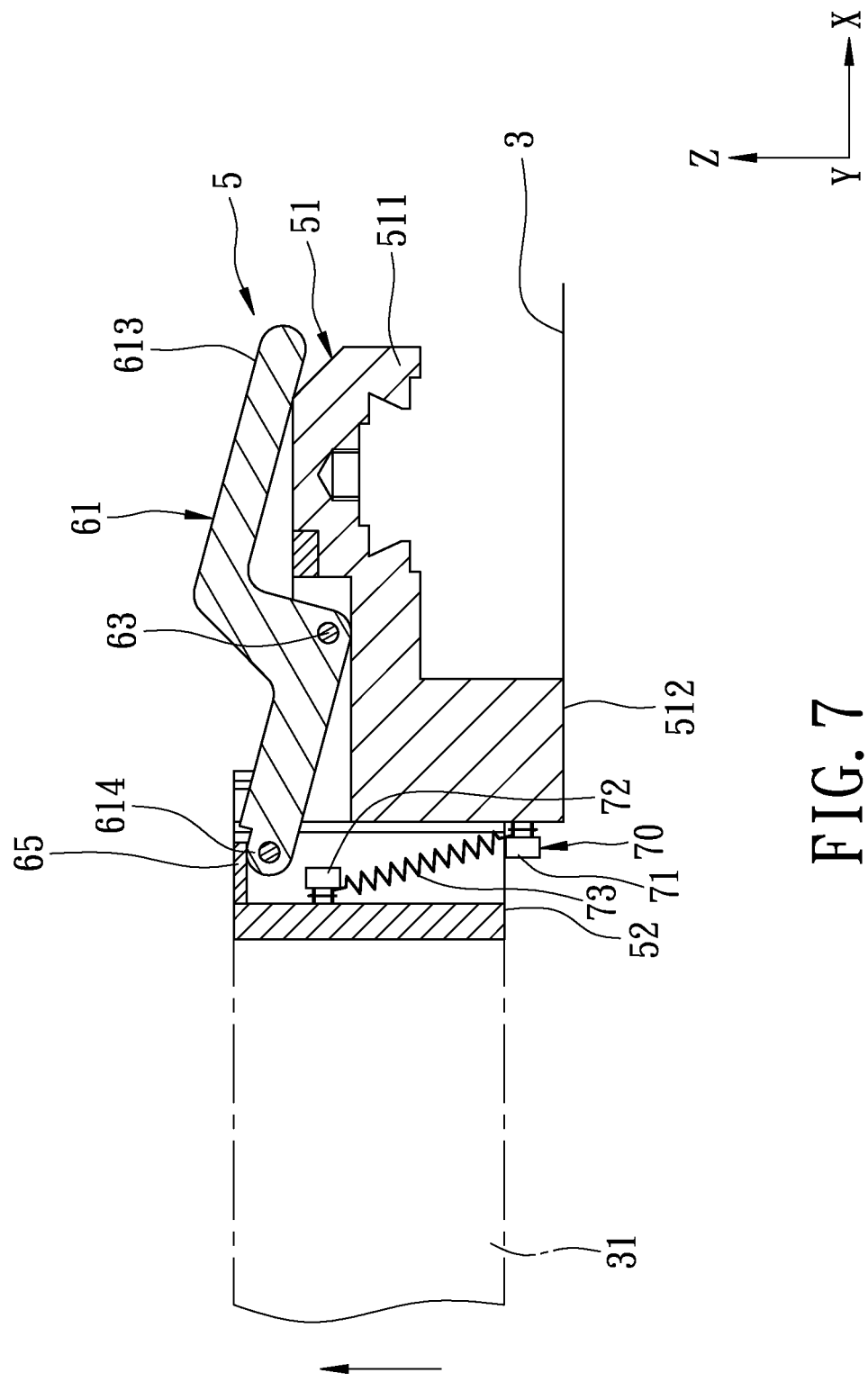
FIG. 7 is a sectional view of the alternative form showing a carrier block in a lifted position.

The biasing unit 70 includes first and second connecting ledges 71, 72 which respectively extend from the tenon body (53b) and the rear surface 523 and which are spaced apart from each other in the first transverse direction (Z), and a biasing member 73 which is connected to the first and second connecting ledges 71, 72 so as to bias the carrier block 52 toward the normal position. In this embodiment, the biasing member 73 is a coil spring which is compressed when the carrier block 52 is in the lifted position. Alternatively, as shown in FIG. 7, the biasing member 73 may be a coil spring which is tensed when the carrier block 52 is in the lifted position.

When it is desired to quickly move the tool 31 away from a workpiece (not shown), the power end 613 is pressed manually toward the tool post body 51 so as to turn the weight end 614 about the pivot axis of the pivot pin 63. Hence, the elongated bar 65 and the carrier block 52 are moved in the first transverse direction (Z) against the biasing action of the biasing member 73. When the pressing force upon the power end 613 is removed, the carrier block 52 is moved back to the normal position by means of the biasing member 73.

It is noted that the carrier block 52 can be moved to the normal position by means of its weight when the first transverse direction (Z) is oriented in an upright direction. In that case, the biasing unit 70 may be dispensed with.

Figure 8:
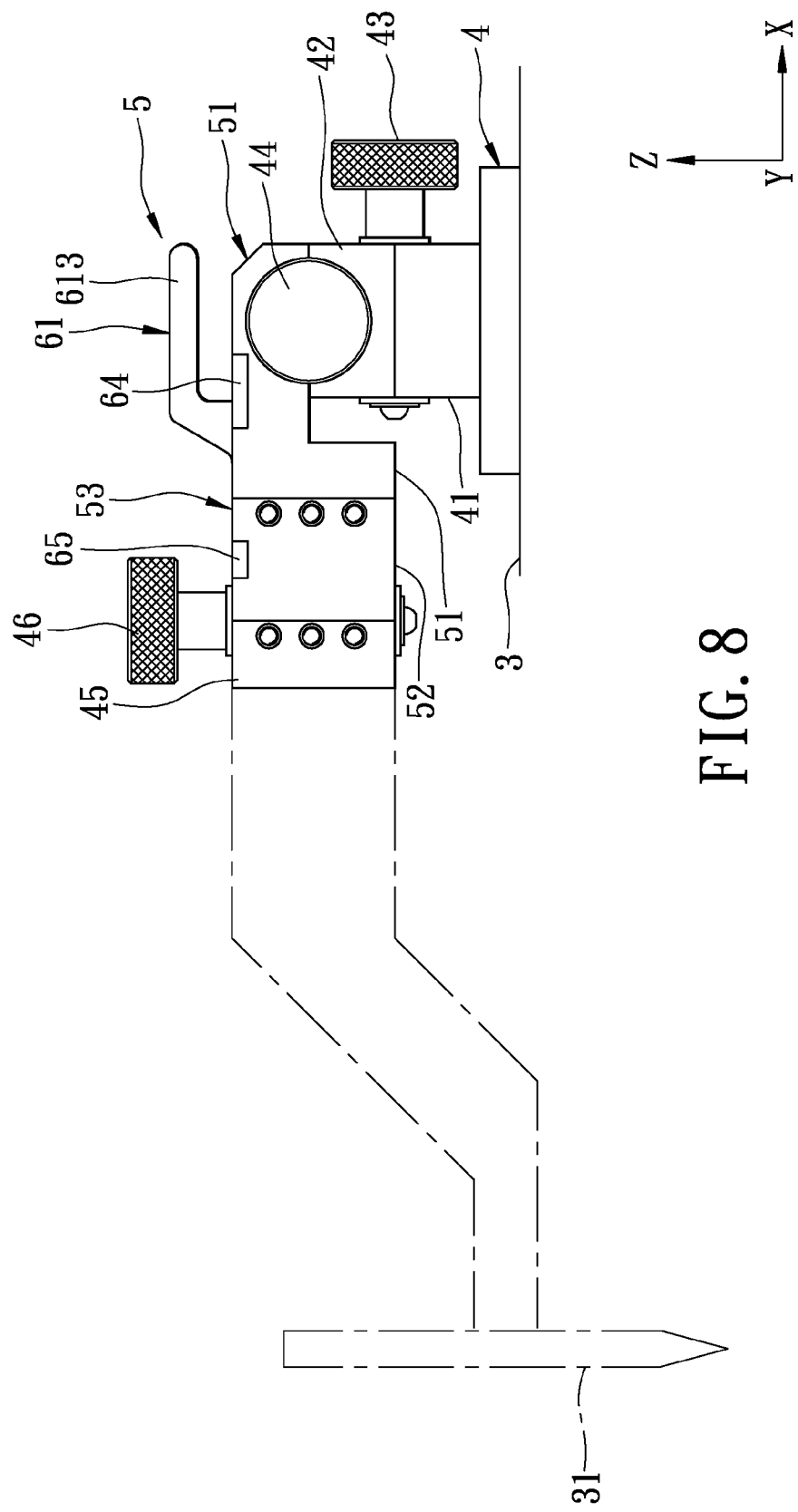
FIG. 8 is a schematic view of the second embodiment of a tool post assembly according to this invention.
Figure 9:
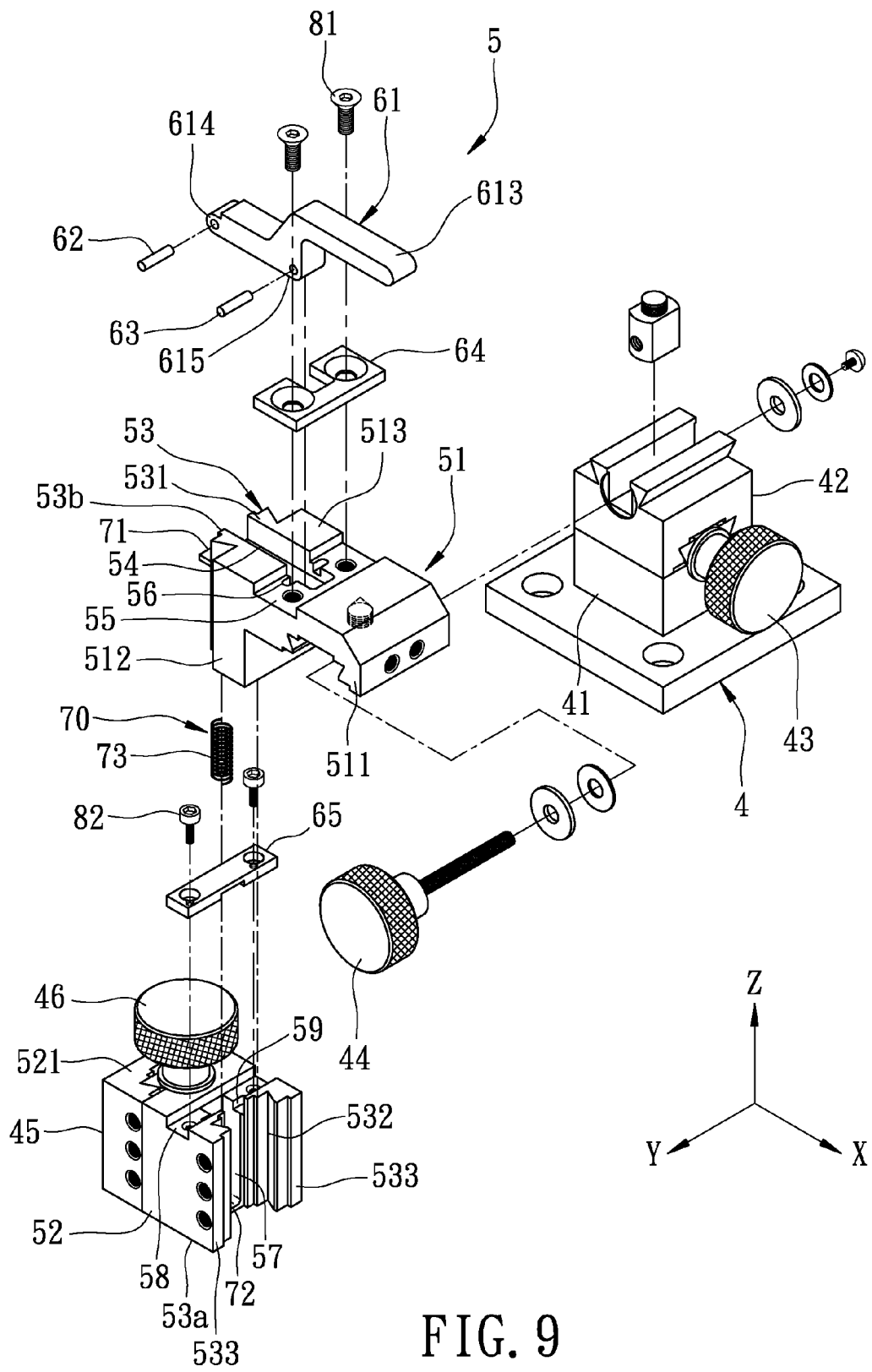
FIG. 9 is an exploded perspective view of the second embodiment.
Figure 10:
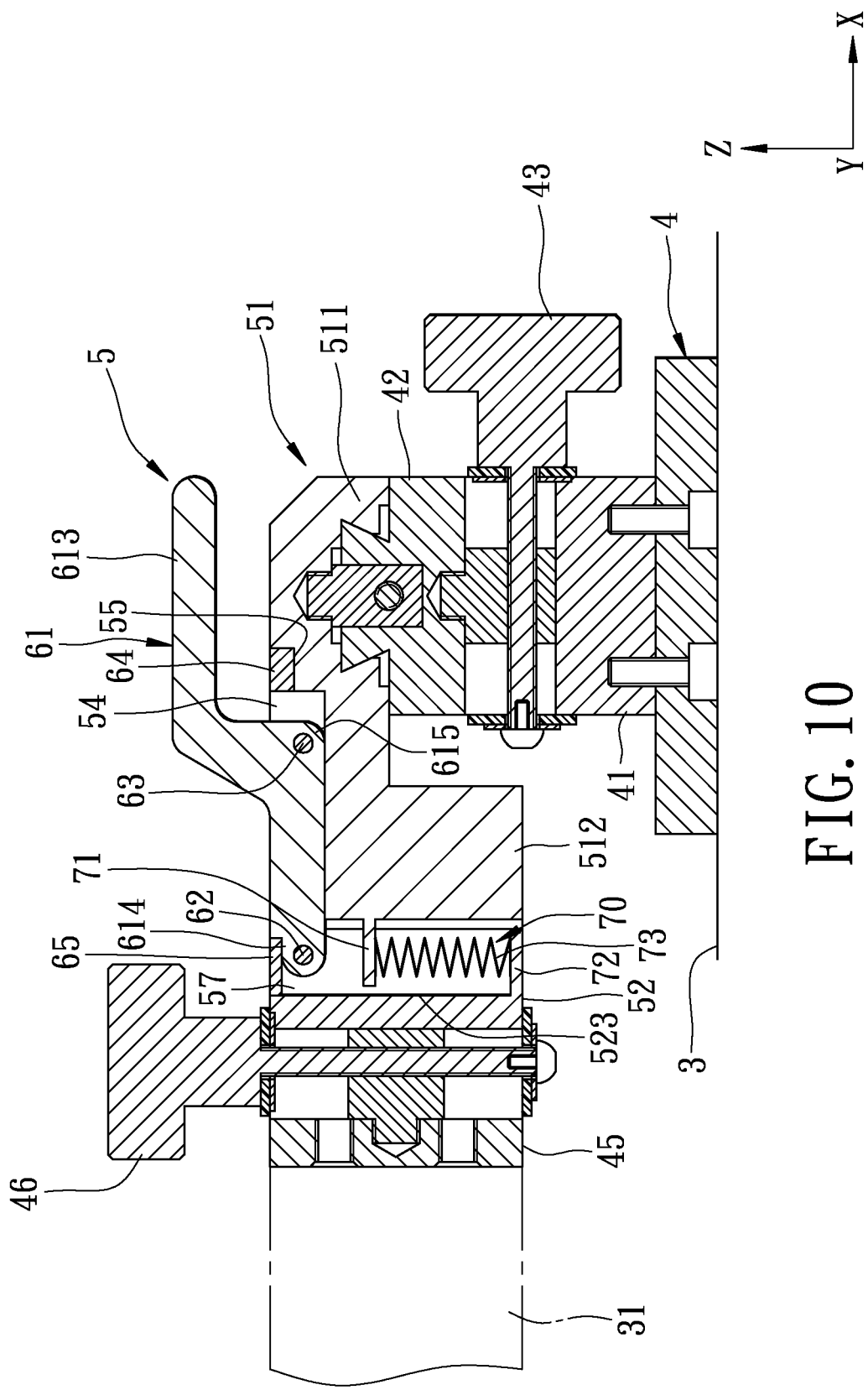
FIG. 10 is a sectional view of the second embodiment.

Referring to FIGS. 8 to 10, the second embodiment of the tool post assembly 5 according to this invention, which is similar to the above-mentioned embodiment in structure, is incorporated with a carriage 4. The carriage 4 includes a saddle 41 secured on an apron 3. A cross-slide 42 is slidably mounted on the saddle 41 and has a first feedscrew 43 to perform a longitudinal movement in the longitudinal direction (X). The slide-side segment 511 of the tool post body 51 is slidably mounted on the cross-slide 42 and driven by a second feedscrew 44 to perform a second transverse movement in the second transverse direction (Y). A cantilevered tool holder 45 is slidably mounted on the carrier block 52 and having a third feedscrew 46 to perform a first transverse movement in the first transverse direction (Z) for holding a tool 31. Thus, the tool 31 can be adjusted in the longitudinal, first transverse and second transverse directions (X, Z, Y), and quickly displaced in the first transverse direction (Z) as required.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A tool post assembly capable of allowing quick displacement of a tool of a machine tool, comprising:
    a tool post body having slide-side and carrier-side segments opposite to each other in a longitudinal direction, said slide-side segment being adapted to be mounted on the machine tool, said carrier-side segment having a mount surface which extends in the longitudinal direction away from said slide-side segment to terminate at a first marginal edge, and a front surface which extends from said first marginal edge in a first transverse direction that is transverse to the longitudinal direction;
    a carrier block having a top surface which extends in the longitudinal direction to terminate at a second marginal edge, and a rear surface which extends from said second marginal edge in the first transverse direction, and which is spaced apart from said front surface in the longitudinal direction;
    a linear guide mechanism which is disposed between said front and rear surfaces to permit said carrier block to be movable relative to said tool post body in the first transverse direction between normal and lifted positions;
    a ledge disposed to extend from said second marginal edge toward said first marginal edge; and
    a lever pivotally mounted on said mount surface about a pivot axis which is oriented in a second transverse direction that is transverse to the longitudinal and first transverse directions, said lever having a power end which is manually operable, and a weight end which extends beyond said first marginal edge, and which is engaged with said ledge such that, when said power end is actuated, said carrier block is moved from the normal position to the lifted position.

2. The tool post assembly as claimed in claim 1, wherein said linear guide mechanism is of a tenon-and-mortise structure.

3. The tool post assembly as claimed in claim 2, wherein said tenon-and-mortise structure includes a mortise body which is coupled to said rear surface, and which has a dovetail recess region, and a tenon body which is coupled to said front surface, and which has a dovetail wedge region that is interlockably and slidably engaged in said dovetail recess region.

4. The tool post assembly as claimed in claim 3, wherein said mortise body has two lateral halves which are spaced apart from each other in the second transverse direction by an elongated gap that is configured to permit said weight end to pass therethrough.

5. The tool post assembly as claimed in claim 4, wherein said carrier block has two spacers which are disposed between said mortise body and said rear surface, and which are spaced apart from each other in the second transverse direction by an elongated groove that communicates said elongated gap so as to accommodate said weight end.

6. The tool post assembly as claimed in claim 5, wherein said spacers are lower than said top surface so as to form a recessed cavity that extends in the second transverse direction.

7. The tool post assembly as claimed in claim 6, wherein said carrier block has an elongated bar which is fitted in said recessed cavity, which is fastened to said spacers, and which has a bridging segment that spans over said elongated groove to serve as said ledge.

8. The tool post assembly as claimed in claim 5, further comprising a biasing unit disposed in said elongated groove to bias said carrier block toward the normal position.

9. The tool post assembly as claimed in claim 8, wherein said biasing unit includes first and second connecting ledges which respectively extend from said tenon body and said rear surface and which are spaced apart from each other in the first transverse direction, and a biasing member which is connected to said first and second connecting ledges so as to bias said carrier block toward the normal position.

10. The tool post assembly as claimed in claim 3, wherein said mount surface has a longitudinal concavity which extends through said tenon body in the longitudinal direction, a transverse concavity which extends in the second transverse direction and which is in spatial communication with said longitudinal concavity, and a retaining plate which is fitted in said transverse concavity and which is secured to said mount surface so as to retain said lever to said mount surface while permitting said lever to be pivoted about the pivot axis.

11. The tool post assembly as claimed in claim 7, wherein said mount surface has a pivot receiving cavity formed in said transverse concavity, said lever having a pivot pin which is retained in said pivot receiving cavity by said retaining plate.

\* \* \* \* \*